United States Patent [19]

Katsuyama et al.

[11] Patent Number: 4,612,294

[45] Date of Patent: Sep. 16, 1986

[54] GLASS MATERIAL FOR OPTICAL FIBERS USED IN INFRARED REGION

[75] Inventors: Toshio Katsuyama, Hachioji; Shin Satoh, Iruma; Hiroyoshi Matsumura, Saitama, all of Japan

[73] Assignees: Hitachi, Ltd.; Hitachi Cable, Ltd., both of Tokyo, Japan

[21] Appl. No.: 674,769

[22] Filed: Nov. 26, 1984

[30] Foreign Application Priority Data

Nov. 28, 1983 [JP] Japan .................. 58-222073

[51] Int. Cl.⁴ .............................................. C03C 3/32
[52] U.S. Cl. ................... 501/40; 65/DIG. 15; 501/37; 501/904
[58] Field of Search ......... 501/904, 40, 37, 42; 252/62.3 S; 420/579, 556; 357/61, 63; 350/96.34; 65/DIG. 15

[56] References Cited

U.S. PATENT DOCUMENTS

| | | | |
|---|---|---|---|
| 3,360,649 | 12/1967 | Brau et al. | 501/40 |
| 3,511,992 | 5/1970 | Patterson | 501/40 |
| 3,615,413 | 6/1969 | Fisher et al. | 420/579 |
| 3,627,573 | 12/1971 | Schottmiller et al. | 501/40 |
| 3,901,996 | 8/1975 | Hasegawa et al. | 65/DIG. 15 |
| 4,154,503 | 5/1979 | Lettington et al. | 501/904 |

FOREIGN PATENT DOCUMENTS

| | | | |
|---|---|---|---|
| 59-88338 | 5/1984 | Japan | 501/37 |
| 59-182247 | 10/1984 | Japan | 501/42 |

OTHER PUBLICATIONS

Hilton, A. R. et al., "Non-Oxide IVA-VA-VIA Chalcogenide Glasses Part 1 and Part 2", Physics and Chemistry of Glasses 7(4) Aug. 1966, pp. 105-116.

Feltz, A. et al., "Glass Formation and Structure of Chalcogenide Systems XXV, Permittivity of Vitreous Selenium", J. of Non-Crystalline Solids 51 (1982) pp. 395-398.

*Primary Examiner*—Helen M. McCarthy
*Attorney, Agent, or Firm*—Antonelli, Terry & Wands

[57] ABSTRACT

A selenium-base chalcogenide glass for use as optical fibers suitable for transmitting with low loss infrared rays, particularly that of 10.6 μm in wavelength, is provided. The infrared optical fibers with low transmission loss, which is suitable for practical use, are obtained by incorporating 2 to 100 ppm of at least one of Al Ga, and In into a selenium-base chalcogenide glass, thereby to reduce the absorption due to the vibration of Ge—O bond formed by the contamination with oxygen. The infrared optical fibers made of such a glass material show a transmission loss of 3-4 dB/m which is less than 1/2.5 of the loss (10 dB/m) of a reference glass.

11 Claims, 3 Drawing Figures

GLASS MATERIAL FOR OPTICAL FIBERS USED IN INFRARED REGION

BACKGROUND OF THE INVENTION

1. Field of the Invention.

This invention relates to a chalcogenide glass material used as optical fibers capable of transmitting infrared rays, particularly the ray of 10.6 μm in wavelength.

2. Description of the Prior Art.

Optical fibers have heretofore been made of materials based on silica glass. Silica glass, however, has a disadvantage in that it is capable of transmitting light having a wavelength of up to approximately 2 μm, but it absorbs substantial amount of a ray having a longer wavelength owing to the lattice vibration. Accordingly, conventional optical fibers of the silica glass type cannot transmit, for example, a ray of 10.6 μm in wavelength which corresponds to that from $CO_2$-laser beam used in laser surgery or laser welding. For this reason, in the past searches for a material which transmits rays having a wavelength in the range of from 2 μm to 20 μm was extensibly carried out. As a consequence, chalcogenide glass was found promising as a useful material in said wavelength range. Of the chalcogenide glasses, the selenium-based glass has its lattice-vibrational absorption in the long wavelength region exceeding 20 μm and, hence, can transmit the $CO_2$-laser beam of 10.6 μm in wavelength. However, upon examination of the optical absorption characteristics of a germanium (Ge)-selenium (Se) glass as a typical example of Se-based glass, it is seen that, as shown in FIG. 1 attached hereto, there exists a strong absorption at a wavelength of 12.8 μm due to the vibration of Ge-O bond formed by the contamination with oxygen. The tail of this vibrational absorption extends to a wavelength of 10.6 μm. Owing to this absorption, the temperature of Ge-Se glass is elevated, leading to an abrupt increase in the absorption by free electrons. As a consequence, optical fibers consisting of such a type of glass have an important defect of a large absorption loss so that it is not practically used.

SUMMARY OF THE INVENTION

An object of this invention is to provide a chalcogenide glass composition which is free from the aforementioned problems of conventional chalcogenide glass such as impurities, particularly contamination with oxygen and which can be used in producing low-loss optical fibers for transmitting infrared rays.

To achieve the object, the infrared optical fiber of this invention is characterized by containing 2 ppm or more and 100 ppm or less of at least one of the aluminum (Al), gallium (Ga), and indium (In) in order to decrease the absorption loss due to Ge-O bond, which adversely affects transmission characteristics of the $CO_2$-laser beam at 10.6 μm.

DETAILED DESCRIPTION OF THE PRESENTLY PREFERRED EMBODIMENTS

The invention will be described in detail hereunder with reference to the drawings.

Figure 1:
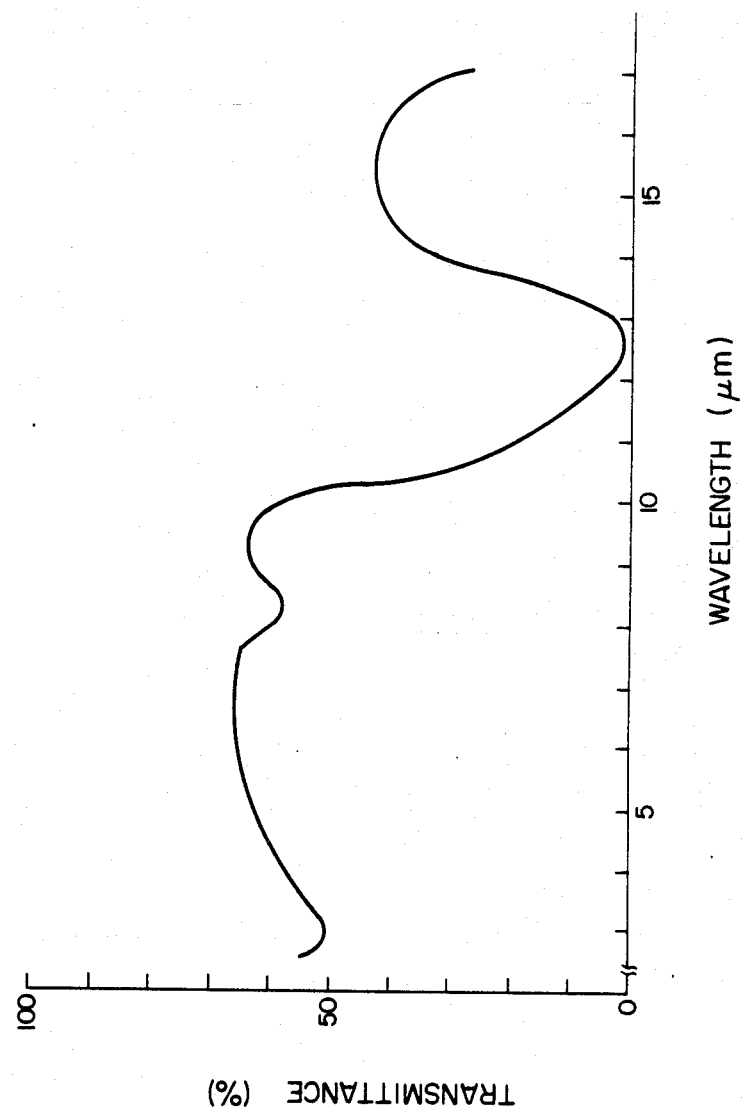
FIG. 1 is a diagram showing the light transmission characteristics of a Ge(30 mole-%)-Se(70 mole-%) chalcogenide glass.
Figure 2:
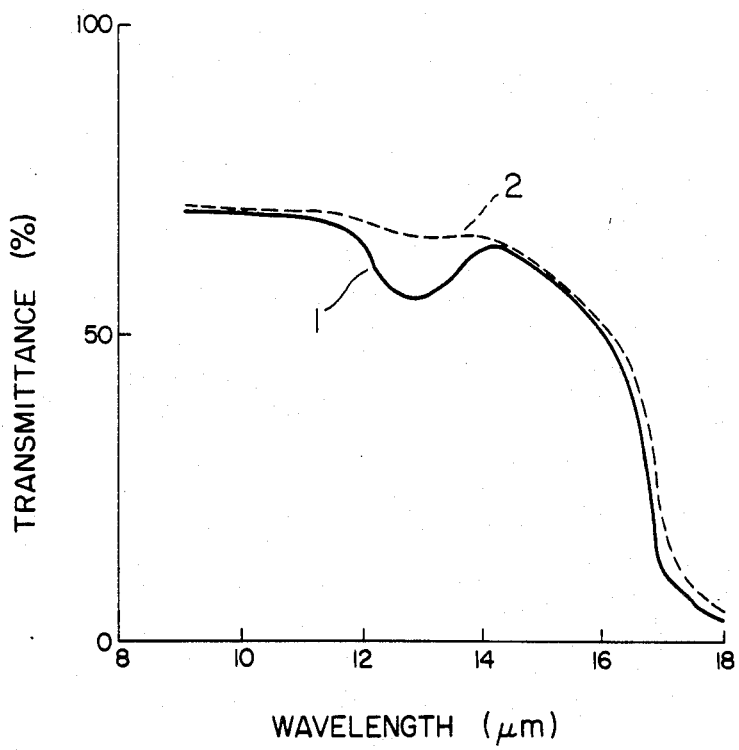
FIG. 2 is a diagram which shows the difference of light transmittance between a chalcogenide glass containing aluminum and that containing no aluminum.

Examination was carried out on the relationship between the absorption due to the Ge-O bond in Ge-Se glass and the amount of Al, Ga or In added to the glass. FIG. 2 represents, as an example, the results obtained in the case of aluminum. In the glass composition, Ge:Se=20:80 (molar ratio). In FIG. 2, where the relationship between transmittance and wavelength is plotted, curve 1 relates to the glass containing no aluminum, and curve 2 the glass containing 10 ppm of aluminum, the maximum transmittance being about 70% owing to the surface reflection. It is seen from FIG. 2 that the absorption at 12.8 μm due to the vibration of Ge-O bond becomes substantially diminished by the addition of aluminum. This fact points out that a chalcogenide glass containing aluminum is effective in transmitting with minimum loss the $CO_2$-laser beam of 10.6 mμ in wavelength.

Figure 3:
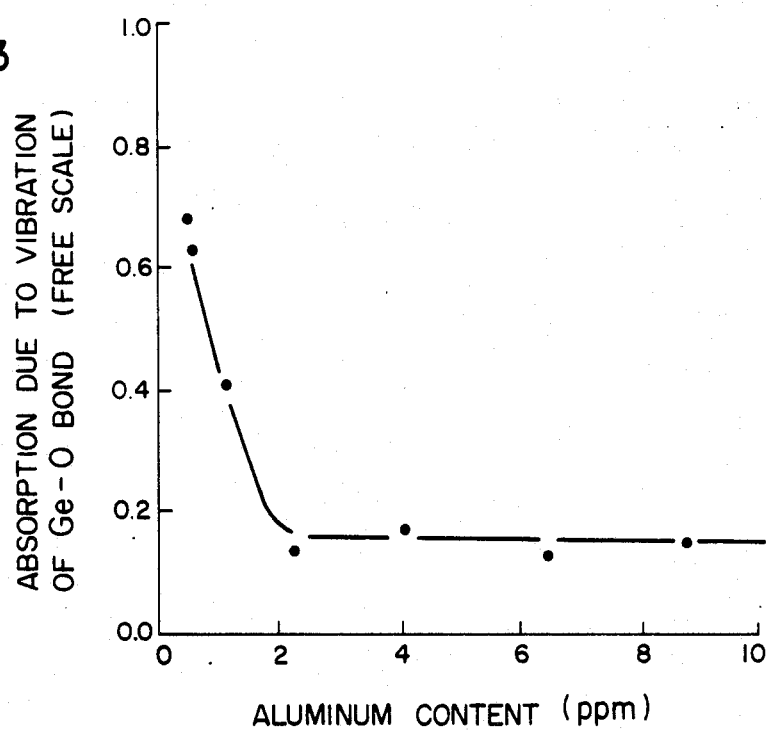
FIG. 3 is a diagram representing the dependence of absorption at 12.8 μm due to the vibration of Ge-O bond upon the aluminum content.

In FIG. 3 are shown the results of quantitative examination on the relationship between the absorption due to vibration of the Ge-O bond and the amount of aluminum added to the glass composition, wherein Ge:Se=20:80 (molar ratio). It is seen from FIG. 3 that the absorption decreases with the increase in aluminum content of the chalcogenide glass until the content reached 2 ppm and then remains constant. This shows that aluminum of an amount of 2 ppm or more is required in order to minimize the absorption. Therefore, the lower limit of aluminum content was decided to be 2 ppm. On the other hand, it was found that the presence of more than 100 ppm of aluminum exerts adverse effect on the glass making because of the reaction which takes place between the aluminum and the silica glass used during glass making. The range of effective amounts of aluminum, therefore, is from 2 to 100 ppm. This effective range was found to be common to selenium-base glasses (e.g. Ge-As-Se glass and Ge-Sb-Se glass). Nearly the same range as above was found effective with other metals, that are gallium and indium.

EXAMPLE 1

Ingot germanium of 99.99999999% purity and selenium shots of 99.999% purity were used as starting materials. These materials were weighed out so that the ratio of Ge:Se may become 20:80 (molar ratio) and sealed together with 10 ppm of 99.999% pure aluminum in a silica glass ampoule at a vacuum of $10^{-5}$ torr. The sealed ampoule was stirred in a vibrating electric furance at 800° C. for 38 hours, and then air-cooled to yield 100 g of a glass block. The resulting block was fabricated into a rod, 10 mm φ×10 cm, by means of a grinder and the rod was drawn through a die to an unclad optical fiber, 1 mm φ×5 m. The light transmission loss at a wavelength of 10.6 μm was found to be 3 dB/m, indicative of a large reduction in loss as contrasted with 10 dB/m of aluminum-free reference glass.

EXAMPLE 2

An optical fiber was prepared in the same manner as in Example 1 using the same Ge-Se composition, except that 20 ppm of gallium was added in place of the aluminum. The resulting optical fiber showed a transmission loss at 10.6 μm of 4 dB/m, indicative of a large reduction in loss, as compared with 10 dB/m of the gallium-free reference glass.

EXAMPLE 3

An optical fiber was prepared in the same manner as in Example 1 using the same Ge—Se glass composition, except that 30 ppm of indium was added in place of the aluminum. The resulting optical fiber showed a transmission loss at 10.6 μm of 3.5 dB/m, indicating a large reduction in loss as compared with 10 dB/m of the indium-free reference glass.

It is seen from the Examples above that the optical fiber glass material for infrared rays, according to this invention, which is a selenium-base chalcogenide glass containing 2 to 100 ppm of at least one of the aluminum, gallium, and indium, shows a large reduction in the deterioration of light transmission characteristics caused by the contamination with oxygen. The present invention is widely adaptable to a technical field utilizing the optical energy, such as laser machining and laser surgery, thereby contributing much to the improvement in those techniques.

What is claimed is:

1. An infrared-transmitting glass material for use as optical fibers used in infrared region, which is a selenium-base chalcogenide glass selected from the group consisting of selenium-germanium glass, selenium-antimony-germanium glass and selenium arsenic-germanium glass in which from 2 ppm to 100 ppm of at least one of aluminum, gallium and indium is incorporated, wherein said glass exhibits a substantial decrease in absorption loss due to Ge—O bond over the same glass absent said incorporation of a least one of aluminum, gallium and indium.

2. The glass material according to claim 1, wherein the composition of the selenium-base chalcogenide glass consists of selenium and germanium.

3. The glass material according to claim 1, wherein the composition of the selenium-base chalcogenide glass consists of germanium, arsenic, and selenium.

4. The glass material according to claim 1, wherein the composition of the selenium-base chalcogenide glass consists of germanium, antimony, and selenium.

5. The glass material according to claim 1, wherein the purity of each of aluminium, gallium, and indium is 99.999% or more.

6. The glass material according to claim 2, wherein the purity of each of germanium and selenium is 99.999% or more.

7. The glass material according to claim 3, wherein the purity of each of germanium and selenium is 99.999% or more.

8. The glass material according to claim 4, wherein the purity of each of germanium and selenium is 99.999% or more.

9. The glass material according to claim 3, wherein the purity of arsenic is 99.999% or more.

10. The glass material according to claim 4, wherein the purity of antimony is 99.999% or more.

11. The glass material according to claim 1, wherein the selenium-base chalcogenide glass is selenium-germanium glass in which the molar ratio of Ge:Se is 20:80.

* * * * *